United States Patent Office 3,468,202
Patented Sept. 23, 1969

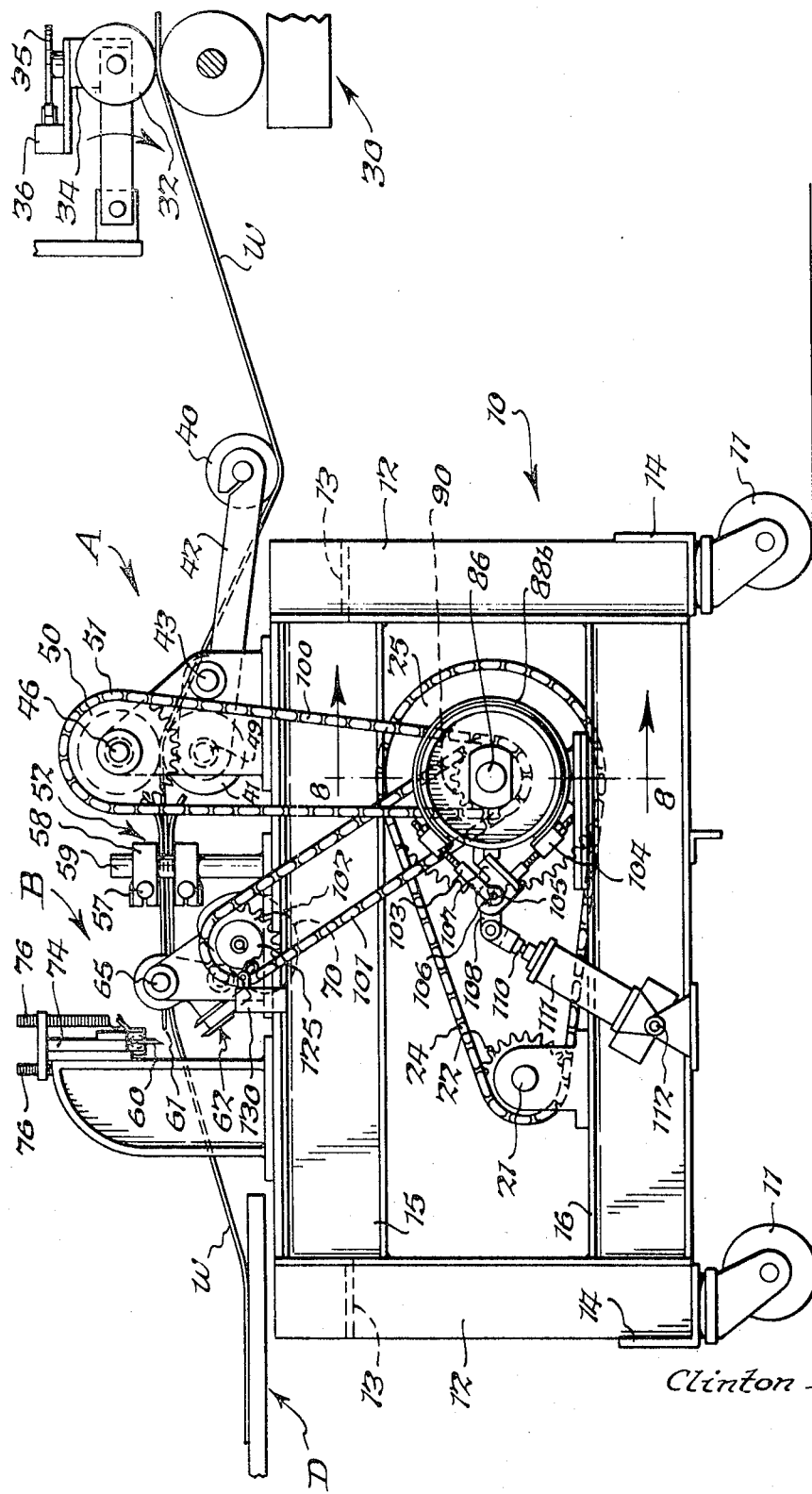

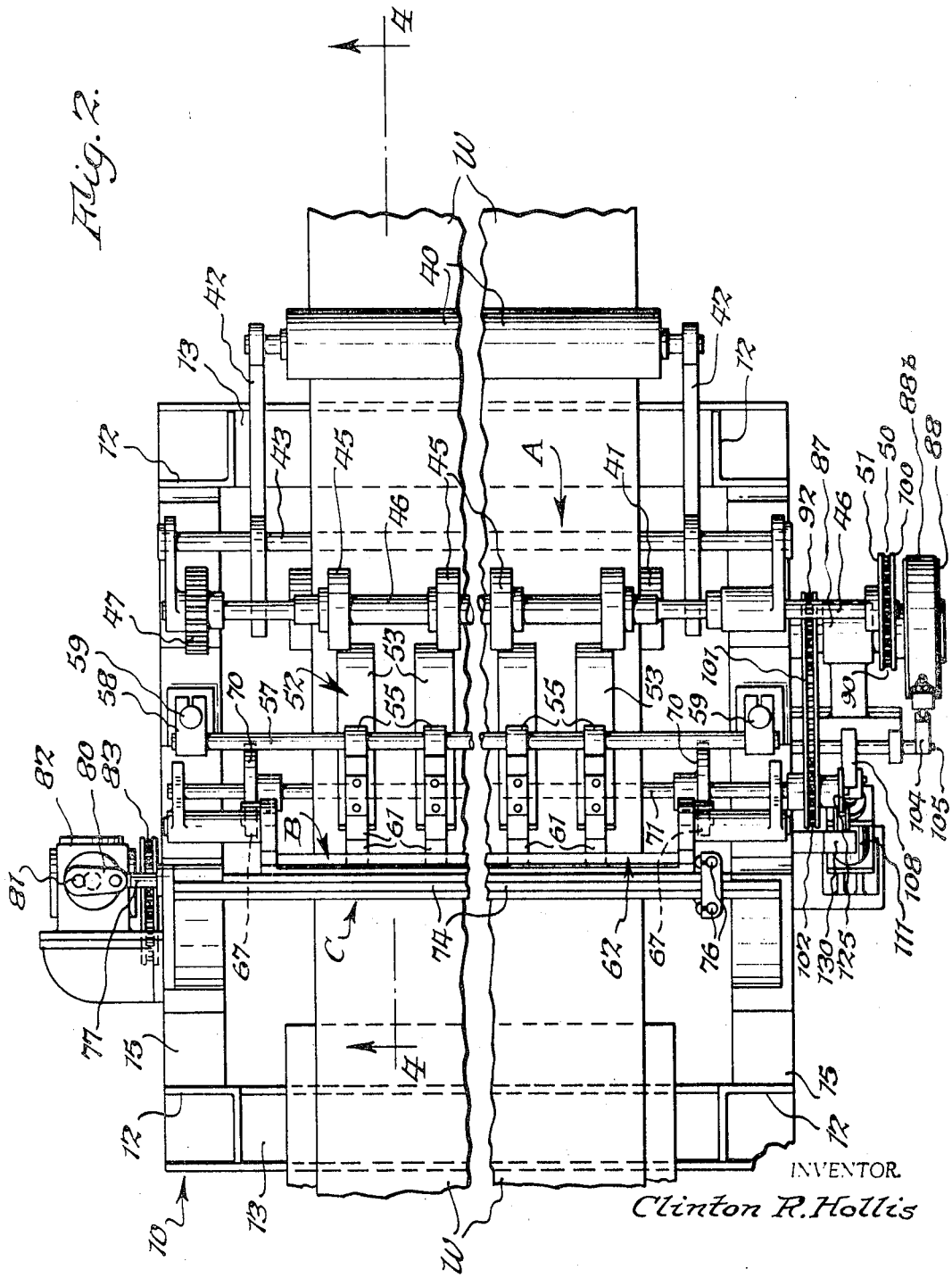

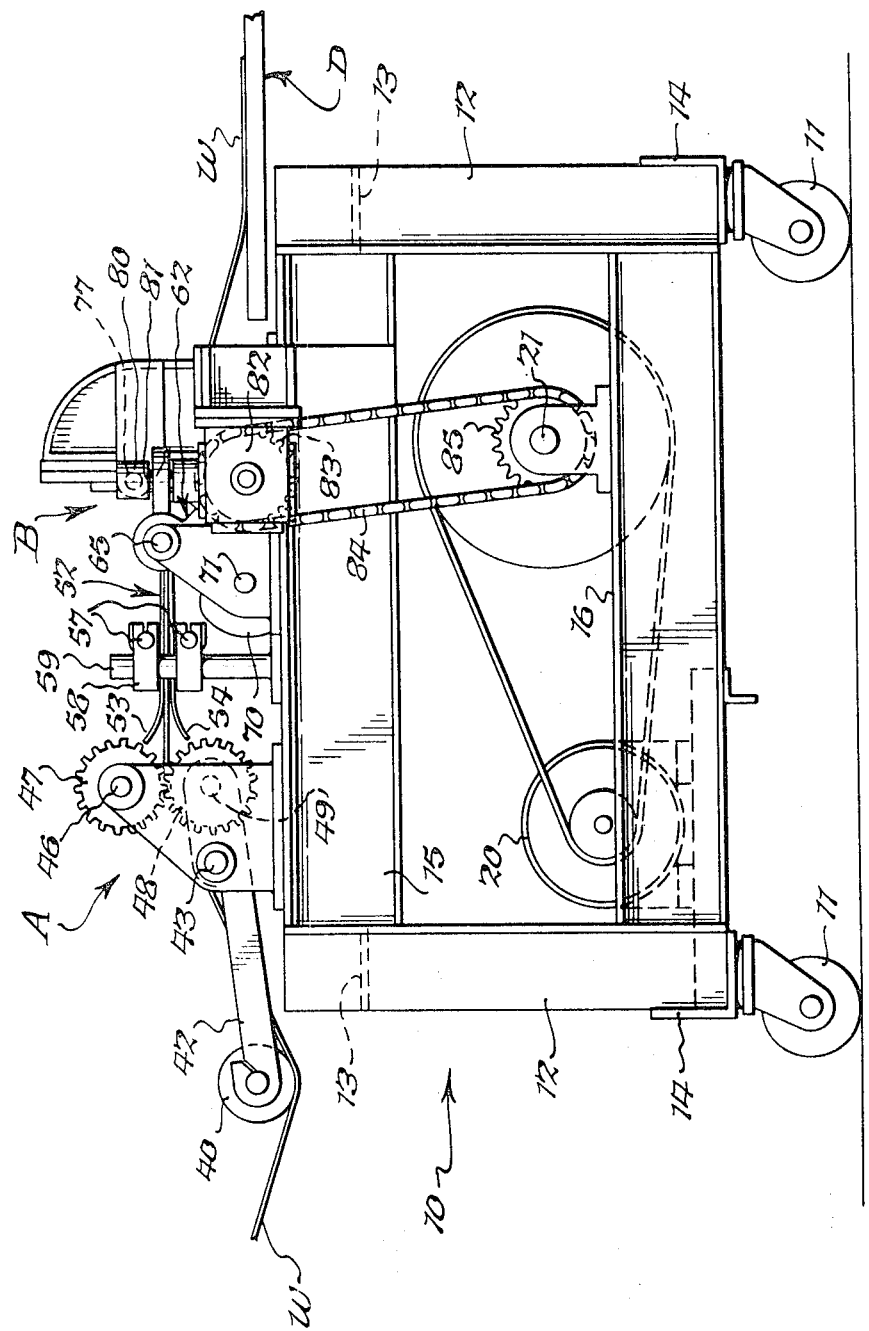

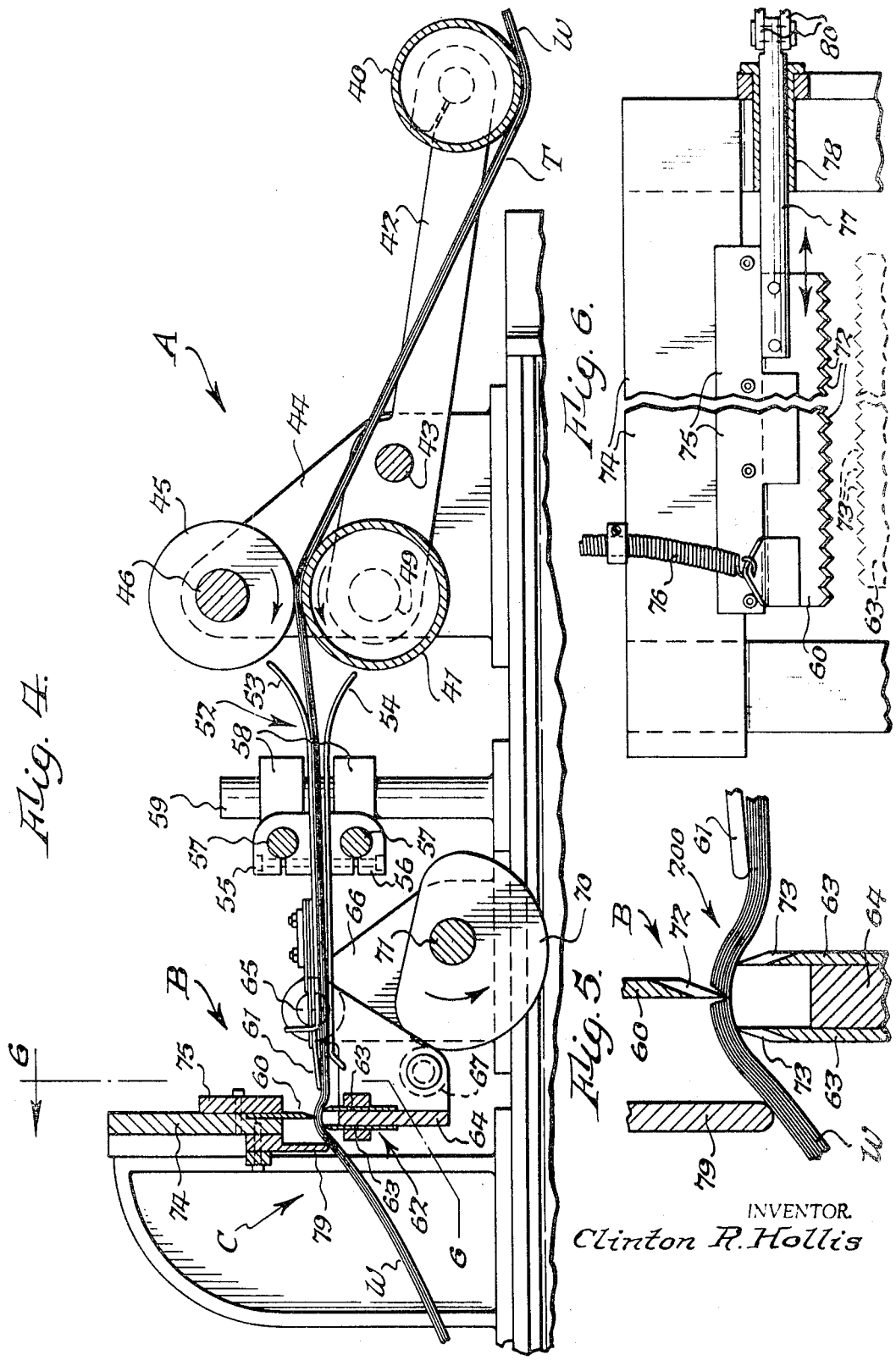

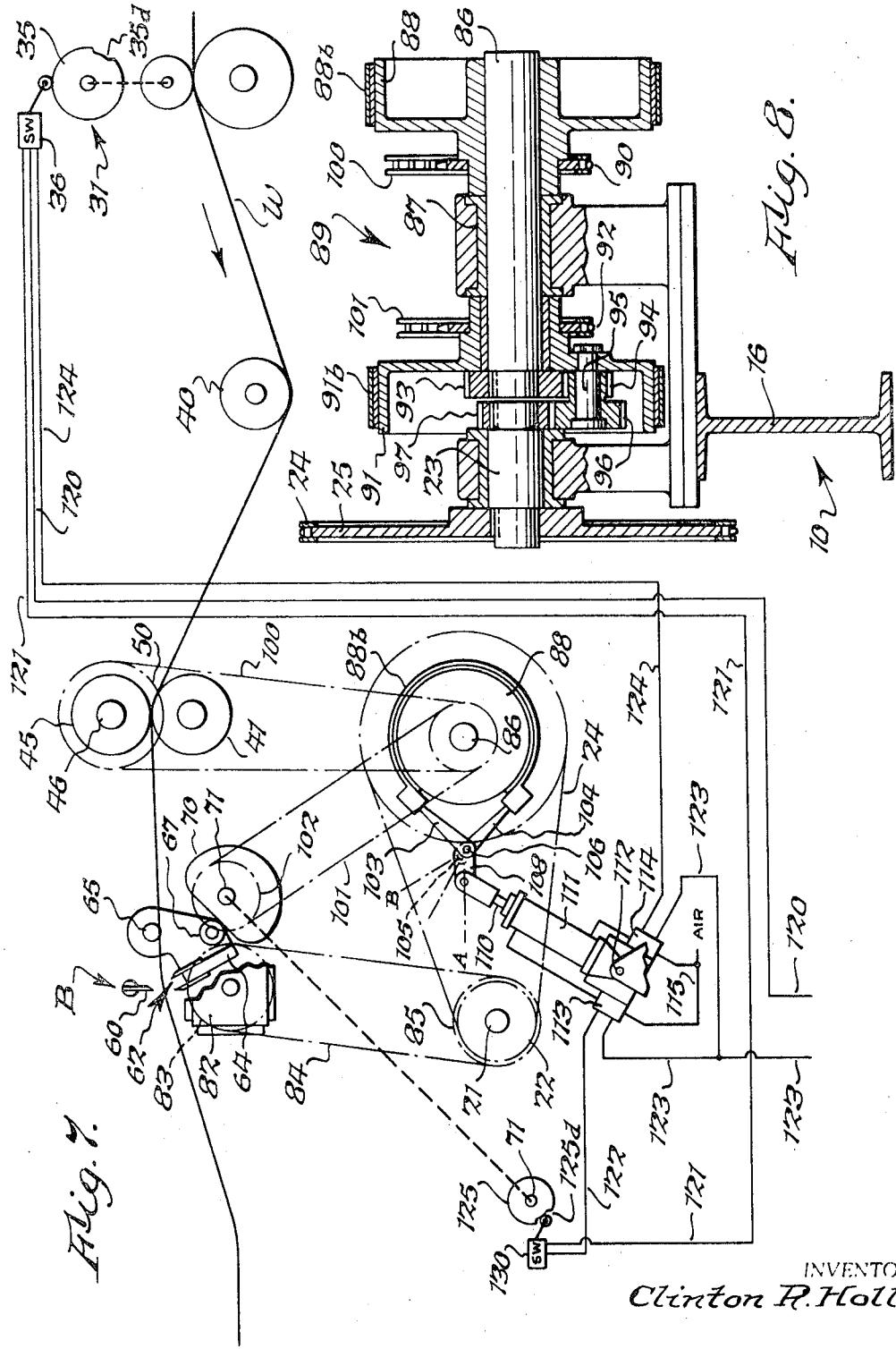

3,468,202
MACHINE FOR CUTTING FLAT FLEXIBLE MULTIWALL TUBING
Clinton R. Hollis, Camden, Ark., assignor to International Paper Company, New York, N.Y., a corporation of New York
Filed Oct. 5, 1966, Ser. No. 584,425
Int. Cl. B26d 5/08, 7/00
U.S. Cl. 83—175                                    7 Claims

ABSTRACT OF THE DISCLOSURE

Apparatus for feeding, in predetermined lengths, a flat flexible multiwall tube, continuously received from a source at a first speed, into a cutter for cutting into predetermined lengths, comprising draw rolls running at a higher second speed which receive the tube and feed it to the cutter, the draw rolls being controlled by a metering station which stops the draw rolls and initiates cutting at predetermined intervals, the draw rolls, by virtue of their higher speed, being capable of taking up the slack caused by continuous feeding from the source during the cutting operation, the rolls being further controlled by a sensing roller to slip on the tube when the slack has been taken out, the cutter being adapted to flex the walls of the tube as the tube cuts to prevent friction between the sides of the cutter blade and the previously cut walls of the tube.

---

This invention relate to an apparatus for feeding a continuous web, for cutting the web into predetermined lengths, and for delivering the cut pieces of such web to a work or collection station and, more particularly, to an apparatus which is adapted to cut a web in the form of continuous tube and consisting of a plurality of plies or thicknesses.

The apparatus of the present invention is particularly useful in the manufacture of multiwall tubes, or bags, made from sheet material such as paper, as shown and described, for example, in U.S. Patent No. 3,266,710, to Reeves, filed December 12, 1961 or made from paper or plastic or combinations thereof and otherwise adapted to be used as inflatable disposable dunnage, as shown and described, for example, in copending application Ser. No. 593,589, filed Nov. 10, 1966 which is a continuation of application Ser. No. 398,214, filed Sept. 22, 1964, now abandoned. Thus, for example, such apparatus may be used to cut a continuous web in the form of a tube and made up of as many as six or seven plies of 100 lb. kraft paper so that, in effect, with the top and bottom of the web superimposed to form such tube, it is necessary to cut through 12 to 14 thicknesses of paper or paper and plastic combinations to cut completely through the web.

Heretofore, machines employed for this purpose have exhibited several disadvantages. To begin with, the great number of plies involved have made the cutting operation extremely difficult, particularly since the just cut plies have had a tendency to get in the way of the cutting means, such as a reciprocating knife, to cause overheating of the knife from friction and jamming or clogging of such knife. Additionally, in machines of the type heretofore employed, the relatively slow rate required for the cutting operation and the cumbersome and bulky nature and lack of mobility of such machines and the adaptability of use of such machines to the many and varied commercially available tubing machines has consistently impaired their use for many purposes.

One general object of this invention, therefore, is to provide a new and improved apparatus for effectively cutting a continuous web into predetermined lengths. More specifically, it is an object of this invention to provide an apparatus which is adapted to cut through a plurality of plies of paper or paper and plastic tubing at a maximum rate.

Another object is to provide a mobile cutting unit for use in connection with many different types of known tubing machines.

Still another object of this invention is to provide a cutting apparatus utilizing comparatively simple mechanical elements, which apparatus is economical to manufacture and thoroughly reliable in operation.

A further object of the invention is to provide a rugged apparatus for cutting a web into lengths in a fast and efficient manner whereby the supplying source may provide a continuous flow of material to the cutting apparatus without interruption.

Another object is to provide a completely self-powered and portable cutting apparatus which can easily be placed at the output section of a supply source or other apparatus, such as a tubing machine, and which apparatus is adapted to cut the web tubing into predetermined lengths with substantial accuracy.

A further object is to provide a cutting apparatus having web feeding means that draws the web to be cut at a rate faster than that at which it is being delivered by the source and having sensing means to cause slipping between the web and the web feeding means when such feed has caught up with the delivery rate. This same mechanism also provides an automatic take up for the accumulation of slack during the cutting period.

A further object is to provide distortion of the plies of the web at the cutting area in such a way as to substantially eliminate the friction of the cut plies against the knife sides and to cut the plies one at a time.

Another object is to provide a feeding and cutting drive mechanism which is simple and extremely reliable with a smooth action.

A still further object is to provide a web lifting means which immediately drops as soon as the cut is completed allowing feed of material to continue and thereby reduce the dwell or non-feed period of time.

In the drawings:
FIG. 1 is a side elevation of the feeding and cutting apparatus of the present invention showing an output section of a web tubing device and further showing a collection station for the cut pieces of such web tubing;
FIG. 2 is a fragmentary top plan view of the apparatus of FIG. 1;
FIG. 3 is a side elevation similar to the side elevation of FIG. 1 but taken on the opposite side of the apparatus;
FIG. 4 is an enlarged fragmentary sectional view of the apparatus taken along line 4—4 of FIG. 2;
FIG. 5 is a fragmentary sectional view showing the cutting mechanism of FIG. 6 greatly enlarged to show how the cut opens to make possible, easier and freer cutting;
FIG. 6 is a sectional view taken along line 6—6 of FIG. 4;
FIG. 7 is a diagram diagrammatic illustration of the apparatus of the invention and showing various parts thereof; and
FIG. 8 is an enlarged sectional view taken along line 8—8 of FIG. 1.

GENERAL ORGANIZATION

Referring to the drawings, it will be seen that the present invention is embodied in an apparatus for automatically feeding a continuous web W, in the form of a multiwall tube T, to a cutting station; for cutting such web into predetermined lengths; and, for delivering such cut lengths to a work or collection station and which includes a web feeding means, generally indicated at A; a web cutting means, generally indicated at B; and, a cut length delivery means, generally indicated at C.

The web W, from a tubing machine, for example, is introduced into the web feeding means A which feeds it into the web cutting means B where such web is cut into predetermined lengths and transferred to the delivery means C which delivers the cut lengths to a collection or work station D.

DESCRIPTION OF APPARATUS

The various mechanisms of this invention are mounted on and supported by a support means or frame 10 having castors 11 at each corner and which further consists of four corner angles 12 which are tied cross-wise by upper and lower I-beam members 15 and 16.

As will be seen by referring to FIG. 3, a motor 20 is fixedly mounted on the frame 10 and it drives a main power shaft 21 while a sprocket 22 thereon drives a stud shaft 23 (FIG. 8) through a chain 24 and a sprocket 25. Through this just mentioned means, the apparatus of this invention is self powered, independent of the tubing or other machine supplying the web material to be cut.

The present apparatus is connected to the tubing machine 30 or other supply source through means of a metering wheel mechanism 31 which is set to ride upon the web W of material being delivered by the tubing machine. A wheel 32 driven by the web W through a gear reduction 34 drives a cam 35 having the follower of a switch 36 in contact with it. In effect, this wheel 32 through its gear reducer 34 measures off a predetermined length of the web W passing under it, and for each revolution of the cam 35 a signal is sent to the web cutting means B to cut the web in a manner further to be described. It is obvious that by changing either the diameter of the wheel 32 or the gear ratio in the gear box the length of the web to be cut can be varied and predetermined.

From the metering wheel mechanism 31, the web W passes under a weighted sensing roll 40 and over a feed roll 41 of web feeding means A. Arms 42 at either side of the web W support these rolls through anti-friction bearings and the arms 42 are fulcrumed at 43 to bearing blocks 44. At the upper end of the blocks 44 are a plurality of draw rolls 45 fixed to a shaft 46. At one end, the shaft 46 carries a spur gear 47 which meshes with a similar spur gear 48 on the shaft 49 of roll 41 causing both to rotate in unison. At the end opposite the gear 47, the shaft 46 carries a sprocket 50 driven at appropriate times by a chain 51. The timing and powering of this mechanism and its chain will be more fully explained hereinafter.

The web W passes between the rolls 41 and 45 and into a web guide means 52 comprising upper and lower fingers 53 and 54, supported by blocks 55 and 56 which are adjustably mounted on upper and lower cross bars 57 for lateral adjustment. At either end of the web W, the fingers 53, 54 are further supported by blocks 58 and are adjustably mounted on vertical bars 59 for vertical adjustment.

The web guide fingers 53 and 54 lead and conduct the web W to a point just under and clearing the web cutting means B. First web positioning means in the form of spring fingers 61 resiliently hold down the web W to clear a knife 60 of such cutting means B and yet allow upward movement of the web W when a web lifting means 62 raises the web W up to the knife 60 to be cut.

The web lifting means 62 comprises a pair of spaced bars 63 which are secured to opposite sides of a cross beam 64 which has pintles 65 mounted for pivoted movement in standards 66 fixedly mounted at either end of the web W on frame 10. A follower 67 is positioned adjacent to the lower edge of the web lifting means and engages a cam 70 on a shaft 71 which, when rotated one revolution, swings the web lifting means 62 from an inoperative position to an operative position, as will be more fully explained.

As will be seen by referring particularly to FIGS. 5 and 6, the knife 60 and the spaced bars 63 each are notched as at 72 and 73. The knife 60 is slidably mounted for reciprocatory movement between a main beam 74 and a presser plate 75 and is held in place by spring retainers 76. The beam 74 also carries second web positioning means in the form of a bar 79 at the side opposite plate 75.

The knife 60 is fastened at one of its ends to a push rod 77 mounted in a slide 78 and connected to the crank arm 80 of a crank pin 81 which is rotated through a crank drive 82. This crank drive is continuously driven through sprocket 83, chain 84 and sprocket 85 fastened to the main power shaft 21 whenever the motor 20 is energized.

It is important to note that the web lifting means 62 and the first and second web positioning means 61 and 79, in combination, comprise web configuration defining means 200 to selectively lift the web into an operative relationship with the web cutting means and to define an upwardly extending obtuse configuration in the web in such operative relationship, for a purpose to be further described.

For proper operation of the various powered units, a differential type of drive mechanism 89 is used instead of a gear shift type. This differential drive has been found to be more durable and reliable, operating without the shock of sudden gear shifting.

As shown most clearly in FIG. 8, the drive mechanism 89 of the present invention primarily comprises a shaft 86 mounted in a main bearing 87 and having fastened thereto at one end a braking drum 88 carrying a sprocket 90 and fastened thereto on its other end another braking drum 91 carrying a sprocket 92. Fastened to the inner end of the shaft 86 is a sun gear 93 which meshes with a planetary gear 94 that rotates about the sun gear 93 at certain times and is also rotatably mounted on a stud shaft 95 carried by the brake drum 91. A companion planetary gear 96 is formed integrally with the planetary gear 94 and it meshes with and rotates about a stud gear 97 at certain times. Stud gear 97 is fastened to the stud shaft 23 and rotates continuously when the motor is turned on.

The sprocket 90 drives the shaft 46 through a chain 100 and sprocket 50 to drive the rolls 41 and 45 while the sprocket 92 drives the cam shaft 71 through a chain 101 and sprocket 102.

The drive mechanism 89 further includes brake bands 88b and 91b which are alternately tightened and loosened through their connection by adjustable links 103 and 104 to a shaft having opposed cranks 105 and 106 which are suitably mounted in a bracket 107. The cranks 105 and 106 are connected to a lever 108 which in turn is connected to the piston rod 110 of a pneumatic cylinder 111 pivoted to the frame 10 at 112.

The cylinder 111 is of a standard well known type having electrical control pneumatic valves 113 and 114 supplied by an air supply line 115 and is operable to move the cranks 105 and 106 into the positions A and B, as shown in FIG. 7. In position A, the apparatus is running normally with the web W being fed through such apparatus. When in position B, feeding of the web W by feed rolls 41 and 45 is discontinued and cutting takes place.

As shown in FIG. 7, in the A position the crank 105 is pulling on the rod 104 to tighten the band 91b onto the drum 91 and the crank 106 is released to loosen the band 88b and allow drum 88 freedom to rotate and deliver power. Thus, the sprocket 92 is stopped and the sprocket 90 is rotating and delivering power to the chain 100, the driving sprocket 50, the shaft 46 and the web feeding rolls 41 and 45 to feed the web W through the apparatus.

Control of air valves 113 and 114 are governed by the aforementioned metering wheel mechanism 31. As wheel 32 measures off a predetermined length of the web W through its gear reduction 34 the cam 35 makes one revolution until the switch follower drops into the dwell 35d to actuate the switch 36. Current then flows from the supply line 120 through the lower now closed contacts of the switch 36 to the line 124 to the cylinder valve 114 and back to the other side of the line 123, completing the circuit to energize the cylinder valve 114 and cause the piston rod 110 to move out and thus move the lever 108 into the B position, as shown most clearly in FIG. 7.

Since the brake drum 91 is now released, the continuously rotating stud gear 97 will rotate the planetary gears 94 and 96 about the now stationary sun gear 93 and cause them to rotate the drum 91, through the stud 95. The rotation of the drum 91 will cause its sprocket 92 to drive the chain 101, the rotating sprocket 102, the shaft 71 and the cam 70 to actuate the web lifting means 62. Rotation of the cam 70 lifts the follower 67 causing the beam 64 and its spaced lifter bars 63 to raise the web W up toward the cutting knife 60.

The web configuration defining means 200 is operable to change the configuration of the web W from its substantially straight line configuration as it leaves the web guide means 52 to an upwardly extending obtuse configuration just prior to the cutting operation. This will be more clearly understood by referring to FIG. 5 where it is seen that the first and second web positioning means 61 and 79 are adapted to limit the upward movement of the web on either side of the web lifting means 62 as such lifting means moves upwardly to lift the web W into operative relationship with the cutting means B. As will be observed, the web W "bends" upwardly and into an obtuse configuration below and in relation to such cutting means. Such obtuse configuration places tension on the multiple plies comprising the web so that the cut edges of each ply will separate and spring out of the way of the cutting knife 60 as each ply is successively cut. The cam 70 is contoured to provide gradual raising of the bars 63 so that the knife 60 only cuts one ply at a time while the obtuse configuration and tensioning of the web lets the plies separate to clear the knife 60, thus relieving the knife sides of rubbing contact and considerable friction.

The notches 73 provide teeth which hold the web W from reciprocation with the knife 60 for more efficient cutting of the web, while the notches 72 in the knife 60 provide a saw tooth effect for more effective cutting.

As the cam 70 rotates, the web W is raised against the knife 60 until such knife has cut through all of the plies. The contour of the cam 70 then allows the web lifting means 62 to lower and provide clearance for the fresh cut edge of the just cut section to drop down out of the way and also provide clearance for the leading edge of the web to clear the knife 60 by the downward biasing of the spring fingers 61 when web W again will feed forward.

While rotation of shaft 71 and cam 70 has been taking place the cut switch cam 125 suitably mounted on the shaft 71 has been rotating with it. At the beginning of rotation, the follower of switch 130 is in the dwell portion of the cam 125 and the contacts of switch 130 are closed to allow completion of the circuit to energize the control valve 113 of the cylinder 111. As rotation of shaft 71 takes place, the follower rides up onto the outside of the cam 125 and the contacts of switch 130 are opened. This opens the circuit to control valve 113 but it has no effect on the cylinder 111 so it stays in the B position, since the valves 113 and 114 do not necessarily have to have constant current energizing them after they have been once energized and have shifted the valve into one position or the other.

At the end of the cutting operation, the dwell 125d on cam 125 rotates into position so that the follower of switch 130 may fall into it thus closing the contacts of switch 130.

Just before this closure occurs, the follower of switch 36 has again moved out of the dwell 35d and onto the outside of cam 35 to close the circuit to control valve 113 again. Therefore, when the follower of switch 130 enters the dwell 125d of cam 125, one revolution is completed and shaft 71 is stopped while shaft 46 is powered to again feed the web through rolls 41 and 45. This action takes place as follows:

Current from the line 120 flows through the now closed upper contacts of the switch 36, the line 121, through the now closed contacts of the switch 130 to the line 122, to the cylinder control valve 113 and back to the other side of the line 123, completing the circuit to energize the cylinder control valve 113 and cause the piston rod to retract and move lever 108 into position A. Through this action the brake 88b is released for drum 88 to rotate again and brake 91b is tightened to stop drum 91 from rotating.

When drum 91 is held from rotation, the rotating stud gear 97 drives the gears 94 and 96 which are now held from planetary action by their now stationary stud 95, to drive the gear 93, the shaft 86, the drum 88 and the sprocket 90. Thus, through the chain 100 and the sprocket 50, the shaft 46 and the draw rolls 41 and 45, the web is again fed through the apparatus.

From the foregoing, it should be obvious that the apparatus just described has the highly desirable advantages that it can be placed at the output of any machine delivering a continuous web and to cut such web into any length desired.

I claim:

1. Apparatus for receiving a continuous, flat, flexible, multiwall tube continuously fed to said apparatus from a supply source at a first speed along a line of travel from said source through said apparatus and for cutting said continuous flat, flexible, multiwall tube into predetermined lengths, said apparatus comprising a base, said base comprising an input end and an output end with respect to said line of travel, a first bar having its length extending laterally across said line of travel, spaced from one side of said line, pivotally mounted on said base for intermittent movement from a first bar position spaced from said line of travel, into and through said line of travel to a second bar position, said bar comprising a pair of legs spaced from each other along said line of travel and extending toward said line of travel from said bar, said legs being further substantially coextensive in length with said bar and being provided on their edges nearest said line of travel with friction means adapted to engage one side of said tube as said first bar travels into and across said line of travel, a knife blade mounted on said base, for reciprocation laterally across said line of travel, said knife blade being substantially parallel to said first bar and spaced from and on the other side of said line of travel, said blade being positioned on said base juxtaposed the space between said pair of legs when said first bar is in said second bar position, a second bar, substantially parallel to said knife, spaced from said knife beyond the output side of said first bar when said first bar is in said second position, said second bar comprising a second bar edge adjacent said line of travel, finger means to retain at least a first portion of said tube substantially in said line of travel, whereby said first bar is adapted to urge a second portion of said tube out of said line of travel into operative cutting engagement with said knife when it moves from said first bar position to said second bar position and said finger means and said second bar means are adapted to urge said first and a third portion of said tube respectively adjacent the input and the outside side of said second portion toward said line of travel to form an obtuse configuration extending over said first bar, toward said knife, a first and a second draw roll means adapted to frictionally engage the sides of said tube therebetween, said first draw roll means being mounted for rotation about its axis on said base on the input side of said finger means, adjacent said line of travel, arm means pivotally mounted on said base for rotation toward and away from said line of travel, said second draw roll means being mounted for rotation about its axis juxtaposed said first draw roll means on said arm means, adjacent said line of travel and for movement with said arm means from a draw position adjacent said line of travel to a slipping position away from said line of travel, a sensing means mounted on said arm means and being adapted to engage said tube and be urged thereby and to urge said arm means to move said second draw roll means from said draw to said slipping position upon application of sufficient tension to said tube by said first and second draw roll means to pull said tube out of said line of travel, said sensing means being further adapted to permit return of said second draw roll means to said draw position upon relaxation of said tension and return of said tube to said line of travel, tube travel measuring means operatively engaging said tube for measuring tube travel through said apparatus and generating a first signal upon completion of a predetermined amount of travel through said apparatus by said tube, draw roll drive means for driving said first and second draw roll means at a second speed, higher than said first speed, said draw roll drive means being operatively engageable with said first and second draw roll means and responsive to said first signal to stop said first and second draw roll means, first bar actuator means responsive to said first signal to move said bar from said first position toward said line of travel, gradually into said line of travel to said second bar position and return said first bar to said first bar position, said first bar actuator means being adapted to generate a second signal upon its return of said first bar to said first bar position, said draw roll drive means being responsive to said second signal to drive said first and second draw roll means to continue said travel of said tube through said apparatus said first and second draw roll means being adapted by running at said higher second speed when driven by said draw roll drive means to take up slack resulting from continuous feeding of said tube by said supply source at said first speed while said first and second draw roll means are stopped by said draw roll drive means.

2. The apparatus of claim 1 wherein said finger means comprises a rod mounted on said base and extending laterally across and on the other side of said line of travel, at least one yieldable finger extending from said rod toward the input side of said first bar, said finger having a yieldable end terminating adjacent the input side of said first bar when said first bar is in said second position and adapted to operatively engage said first portion of said tube.

3. The apparatus of claim 1 wherein said arm means comprises a pair of arms having input and output ends, said sensing means being mounted on said input arm ends and said second draw roll means being mounted on said output arm ends, said arms being pivotally mounted to said base between said ends and further wherein said first draw roll means comprises at least one roller mounted on said base, adjacent the other side of said line of travel, said second draw roll means comprises at least one roller mounted on said base adjacent said one side of said line of travel, said one side of said line of travel being the lower side of said line of travel, said sensing means comprising at least one sensing roller, the moment of said sensing roller on said arms, about said pivotal arm mounting being greater than the moment of said second draw roll means on said arms about said pivotal arm mounting.

4. The apparatus of claim 3 wherein said draw roll drive means comprises a power transmission means, a first power pickup means mounted on said first draw roll means and operatively engaging said transmission means, a second power pickup means mounted on said second draw roll means and operatively engaging said first power pickup means, said first power transmission means being adapted to transmit rotational motion to said first power pickup means, said first power pickup means being adapted to transmit said rotational movement to said first draw roll means and to said second power pickup means, said second pickup means being adapted to transmit rotational motion to said draw roll means.

5. The apparatus of claim 4 wherein said first actuator comprises a second power transmission means, a third power pickup means, a cam means, a cam follower mounted on said first bar, spaced from the pivotal bar mounting and a second cam means, said second power transmission means operatively engaging said third power pickup means for the transmission of rotational motion thereto, said third power pickup means operatively engaging said cam means for the transmission of said rotation motion to said cams, said cam means operatively engaging said cam follower to move said first bar from said first bar position to said second bar position, and back to said first bar position, said third cam means being operative to generate said second signal upon return of said first bar to said first bar position.

6. The apparatus of claim 5 wherein said apparatus further comprises a gear transmission, said gear transmission comprising power input means for continuously rotating a stud shaft mounted for rotation on said base, said stud shaft being provided at one end with a stud gear, said gear transmission further comprising a sun gear shaft mounted for rotation on said base coaxially with said stud shaft and having one end adjacent said stud gear, a sun gear mounted on said adjacent end of the sun gear shaft, a planetary gear housing coaxially mounted for rotation on said sun gear shaft, a planetary gear having an axis of rotation, said planetary gear being mounted for rotation about said planetary gear axis of rotation on said planetary gear housing with said planetary gear axis of rotation spaced from the axis of said sun gear shaft, said planetary gear comprising a first geared surface operatively engaging said stud gear and a second gear surface coaxial with said first gear surface and operatively engaging said sun gear, a first brake drum coaxial with said sun gear shaft, said first brake drum being mounted on said planetary housing, a second brake drum mounted on said sun gear shaft for rotation therewith, said first power transmission means operatively engaging said sun gear shaft for rotation thereby and said second power transmission means operatively engaging said planetary gear housing for rotation thereby, a first brake means operatively engaging said first brake drum, a second brake means operatively engaging said second brake drum, said apparatus still further comprising a brake actuator means responsive to said first signal to simultaneously operatively engage said second brake means with said second brake drum to stop said sun gear shaft and disengage said first brake means from said first brake drum, said brake actuator being further responsive to said second signal to simultaneously operatively engage said first brake means from said first brake drum to stop said planetary gear housing and to disengage said second brake means from said second brake drum.

7. The apparatus of claim 1 wherein said tube travel measuring means comprises a measuring wheel means spaced from and on the input side of said sensing means, said measuring wheel means being adapted to operatively engage said tube and roll on a surface thereof as said tube proceeds along said line of travel, a third cam means, said measuring wheel means being further adapted to rotate said third cam means, said third cam means being adapted to generate said first signal upon completion of a predetermined amount of rotation of said measuring wheel means.

References Cited

UNITED STATES PATENTS

| | | | |
|---|---|---|---|
| 1,393,164 | 10/1921 | Reinhardt et al. | 83—647 X |
| 1,819,991 | 8/1931 | Stevens | 83—208 |
| 2,293,721 | 8/1942 | Engler | 83—566 X |
| 3,170,350 | 2/1965 | Hawkins | 83—208 X |
| 3,318,179 | 5/1967 | Elsas | 83—208 X |

ANDREW R. JUHASZ, Primary Examiner

U.S. Cl. X.R.

83—369, 436, 557, 566, 647